(12) United States Patent
Walton et al.

(10) Patent No.: US 10,944,697 B2
(45) Date of Patent: Mar. 9, 2021

(54) SLIDING WINDOW BUFFER FOR MINIMUM LOCAL RESOURCE REQUIREMENTS

(71) Applicant: Microsoft Technolgoy Licensing, LLC, Redmond, WA (US)

(72) Inventors: Dane Russell Walton, Seattle, WA (US); Marcos Perez Mokarzel, Redmond, WA (US); Gregory David Manyak, Seattle, WA (US); Raimundo Robledo Pontes Filho, Redmond, WA (US); Himanshu Gupta, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 48 days.

(21) Appl. No.: 16/364,229

(22) Filed: Mar. 26, 2019

(65) Prior Publication Data
US 2020/0314034 A1    Oct. 1, 2020

(51) Int. Cl.
*H04L 12/861* (2013.01)
*H04L 5/00* (2006.01)
(Continued)

(52) U.S. Cl.
CPC ............ *H04L 49/90* (2013.01); *H04L 5/0055* (2013.01); *H04L 67/12* (2013.01); *H04L 69/16* (2013.01)

(58) Field of Classification Search
CPC .. H04B 7/155; H04L 1/18; H04L 1/08; H04L 29/08; H04L 29/06; H04L 5/0055; (Continued)

(56) References Cited

U.S. PATENT DOCUMENTS 7,610,397 B2 * 10/2009 Gedik .................... H04L 49/90
                                                                    709/231
8,125,357 B1    2/2012 Hamlet et al.
(Continued)

FOREIGN PATENT DOCUMENTS

EP     0582907 A2    2/1994
EP     0859535 A2    8/1998

OTHER PUBLICATIONS

"Stop-and-Wait" protocol, Retrieved from <<https://web.archive.org/web/20170519124436/http:/www.isi.edu/nsnam/DIRECTED_RESEARCH/DR_HYUNAH/D-Research/stop-n-wait.html>>, May 19, 2017, (4 Pages total).
(Continued)

*Primary Examiner* — Thomas J Dailey
(74) *Attorney, Agent, or Firm* — Mark K. Young; Mayer & Williams, PC

(57) ABSTRACT

A sliding window buffer is implemented on a local computing device that places chunks of content from a data source into a local buffer for transmission on a per-chunk basis. A portion of memory in the local buffer can be re-used for a single data transmission operation until the content is fully transmitted to a remote computing device. Logical positions on the local buffer which correlate to inner positions on the data source are utilized to enable the sliding window buffer to retrieve and retransmit chunks of data, if necessary. An inner position indicates a byte location in the data source and a logical position indicates a corresponding byte position in the local buffer. The local computing device can utilize byte positions to retrieve and re-transmit chunks of data if, for example, the device fails to receive an acknowledgement from the remote computing device for any of the data.

20 Claims, 14 Drawing Sheets

(51) Int. Cl.
*H04L 29/08* (2006.01)
*H04L 29/06* (2006.01)

(58) Field of Classification Search
CPC ....... H04L 49/90; H04L 69/16; H04L 69/163; H04W 4/38
See application file for complete search history.

(56) References Cited

U.S. PATENT DOCUMENTS

| | | | |
|---|---|---|---|
| 8,704,685 B2 | 4/2014 | Kataoka | |
| 9,288,263 B2 | 3/2016 | Rajapakse | |
| 10,644,968 B1* | 5/2020 | Ting | H04L 43/024 |
| 2003/0023738 A1 | 1/2003 | Boivie et al. | |
| 2005/0041582 A1* | 2/2005 | Hancock | H04L 47/14 370/231 |
| 2006/0280158 A1 | 12/2006 | Lo et al. | |
| 2008/0010238 A1* | 1/2008 | Whyte | G06F 16/316 |
| 2010/0163403 A1* | 7/2010 | Kitada | H01L 21/68742 204/164 |
| 2011/0055458 A1 | 3/2011 | Kuehne | |
| 2012/0131235 A1* | 5/2012 | Nageshappa | H04L 69/162 710/22 |
| 2015/0281297 A1* | 10/2015 | Chamberlin | G06F 21/10 709/219 |
| 2017/0257635 A1 | 9/2017 | Xu et al. | |
| 2019/0288770 A1* | 9/2019 | Martin | H04L 1/1829 |

OTHER PUBLICATIONS

"Stop-n-Wait vs. Sliding-Window", Retrieved from <<https://web.archive.org/web/20170508190711/http:/www.isi.edu/nsnam/DIRECTED_RESEARCH/DR_HYUNAH/D-Research/stop-vs-sliding.html>>, May 8, 2017, (3 Pages total).

Loscher, et al., "Efficient and Flexible Sensomet Checkpointing", in European Conference on Wireless Sensor Networks, Feb. 17, 2014, (16 Pages total).

Fairhurst., et al., "Services Provided by IETF Transport Protocols and Congestion Control Mechanisms", Published in RFC Series, vol. 8095, Mar. 7, 2017, 54 Pages.

"International Search Report and Written Opinion issued in PCT Application No. PCT/US2020/022871", dated Jun. 30, 2020, 11 Pages.

* cited by examiner

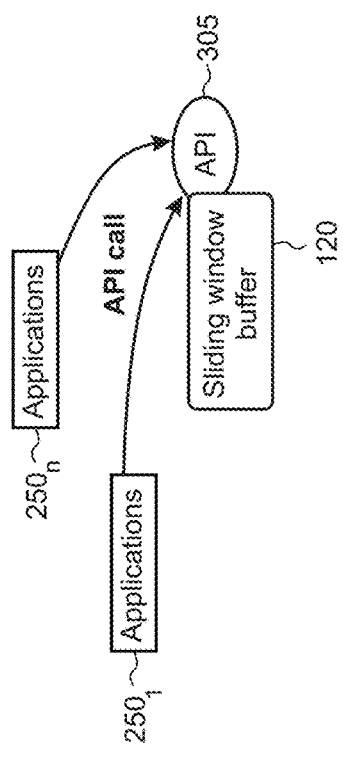
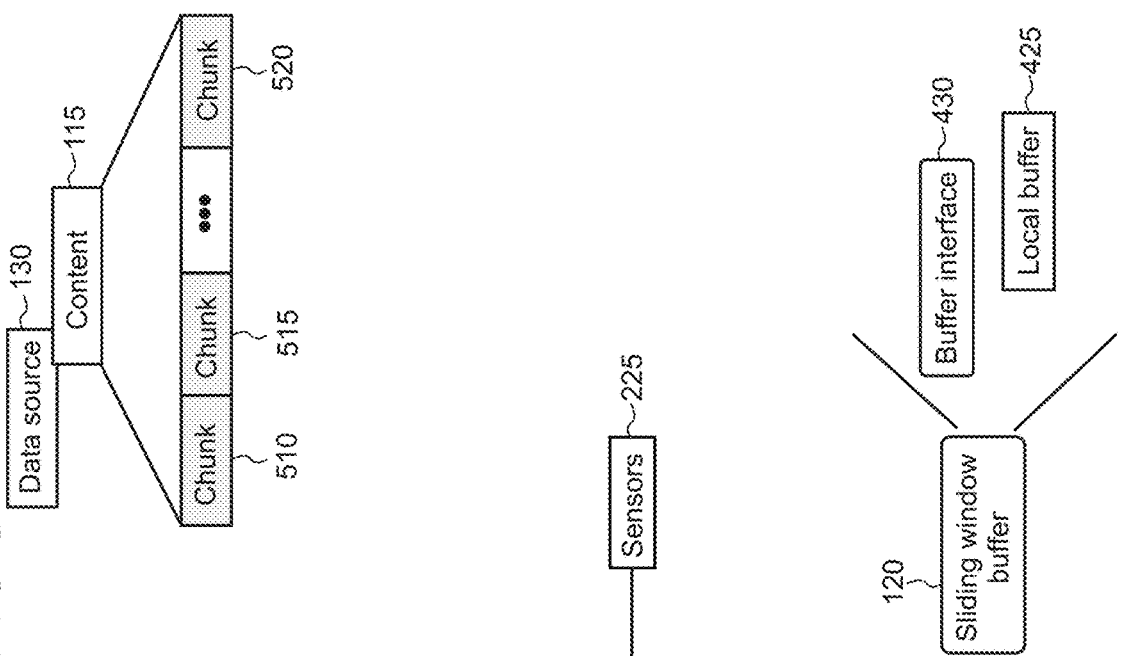
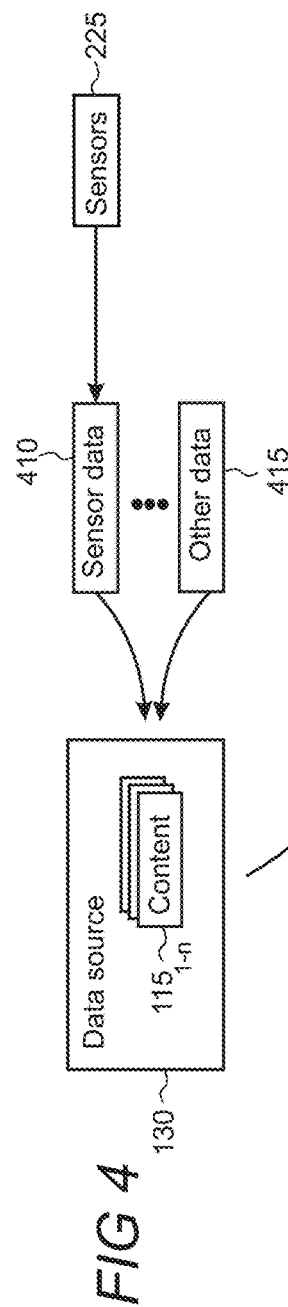

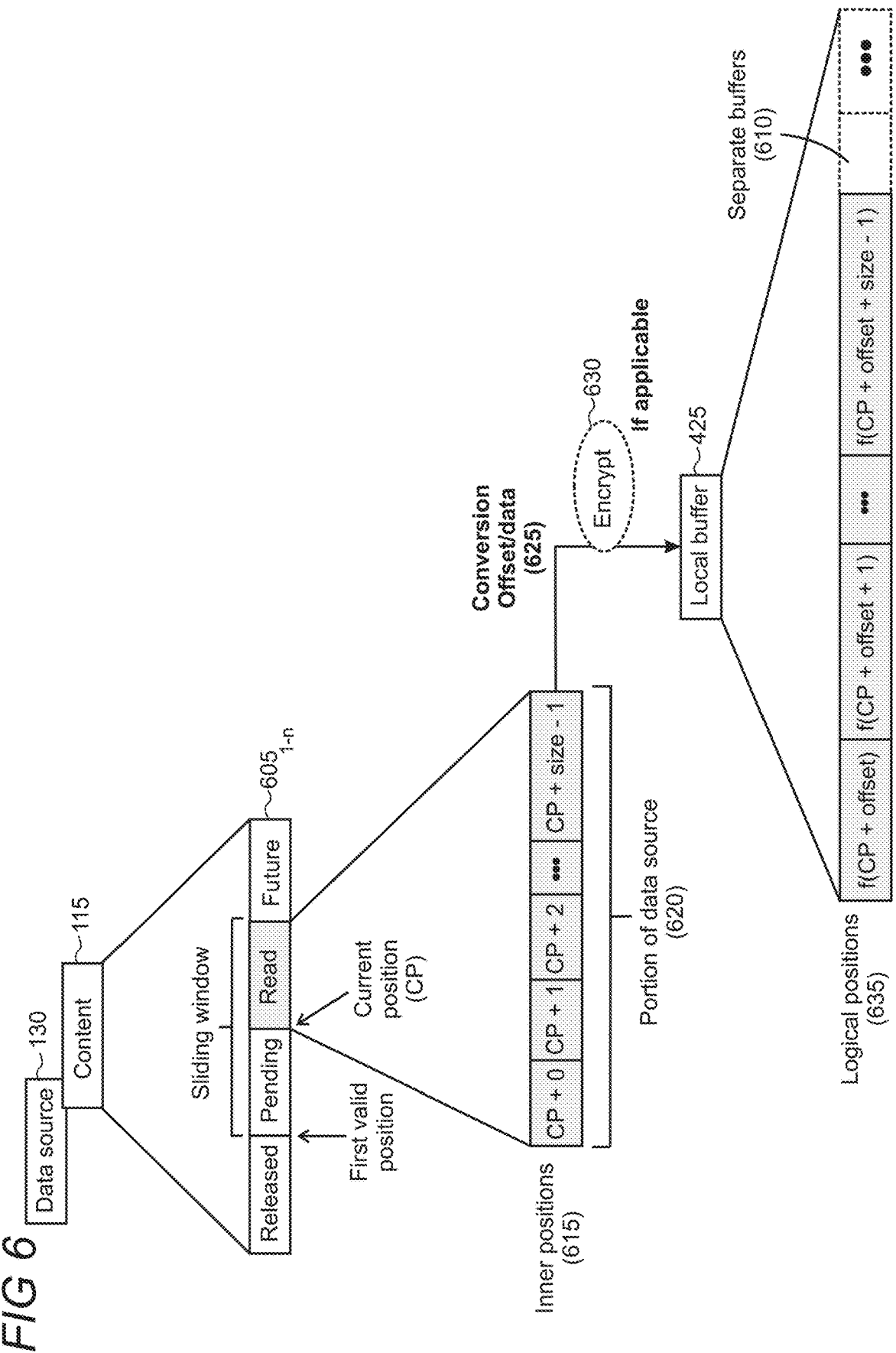

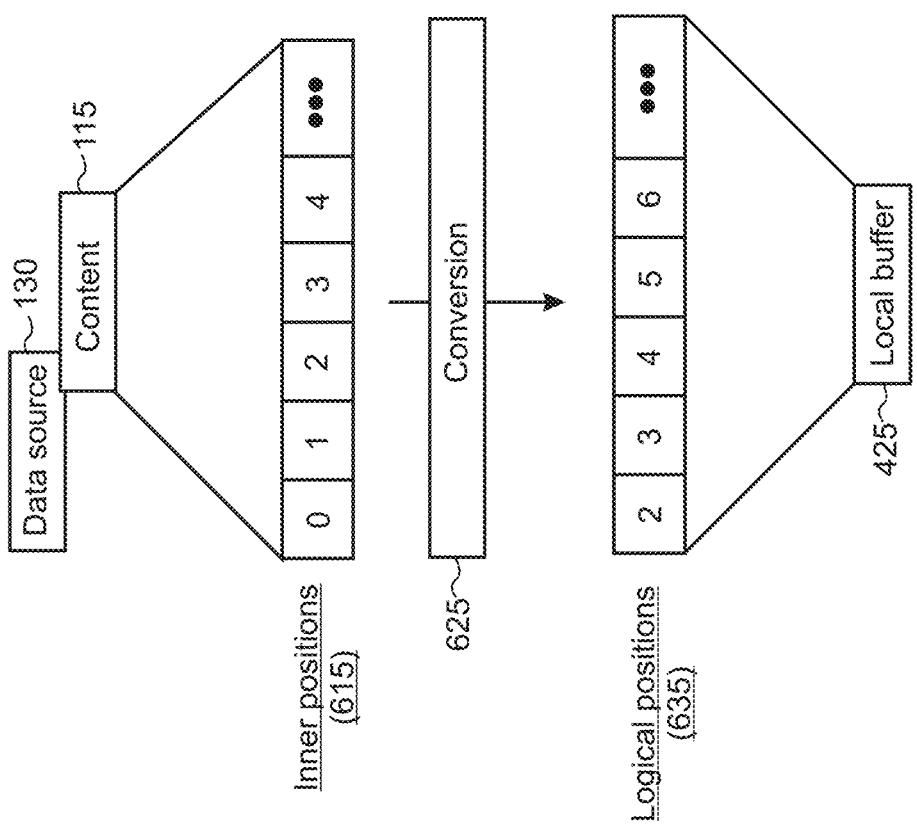
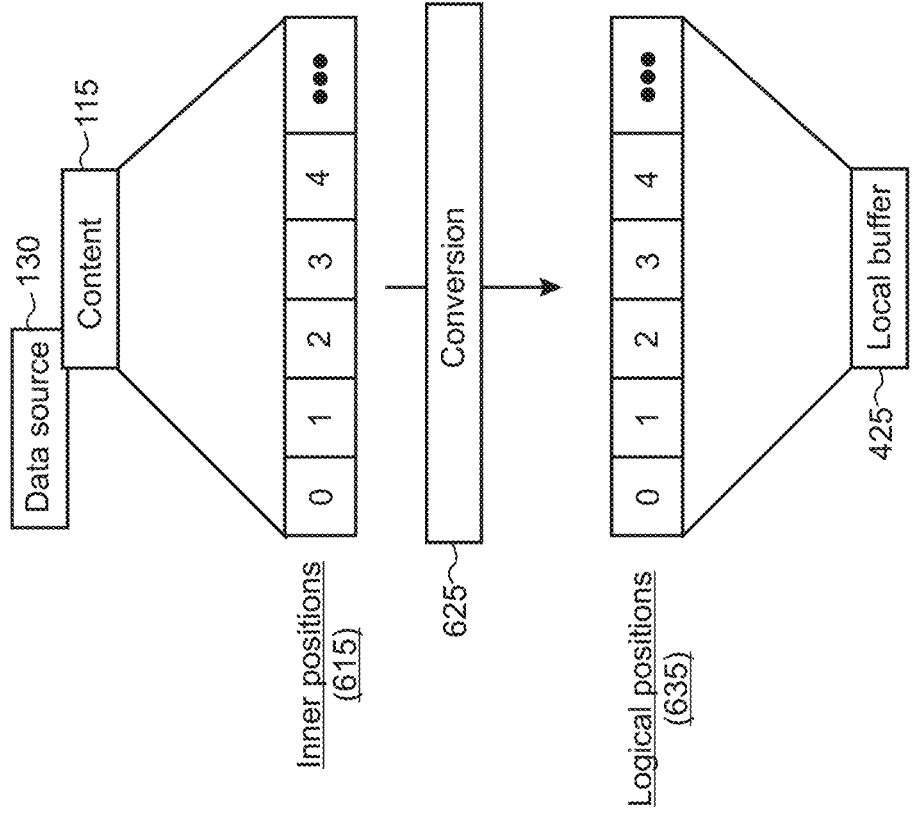

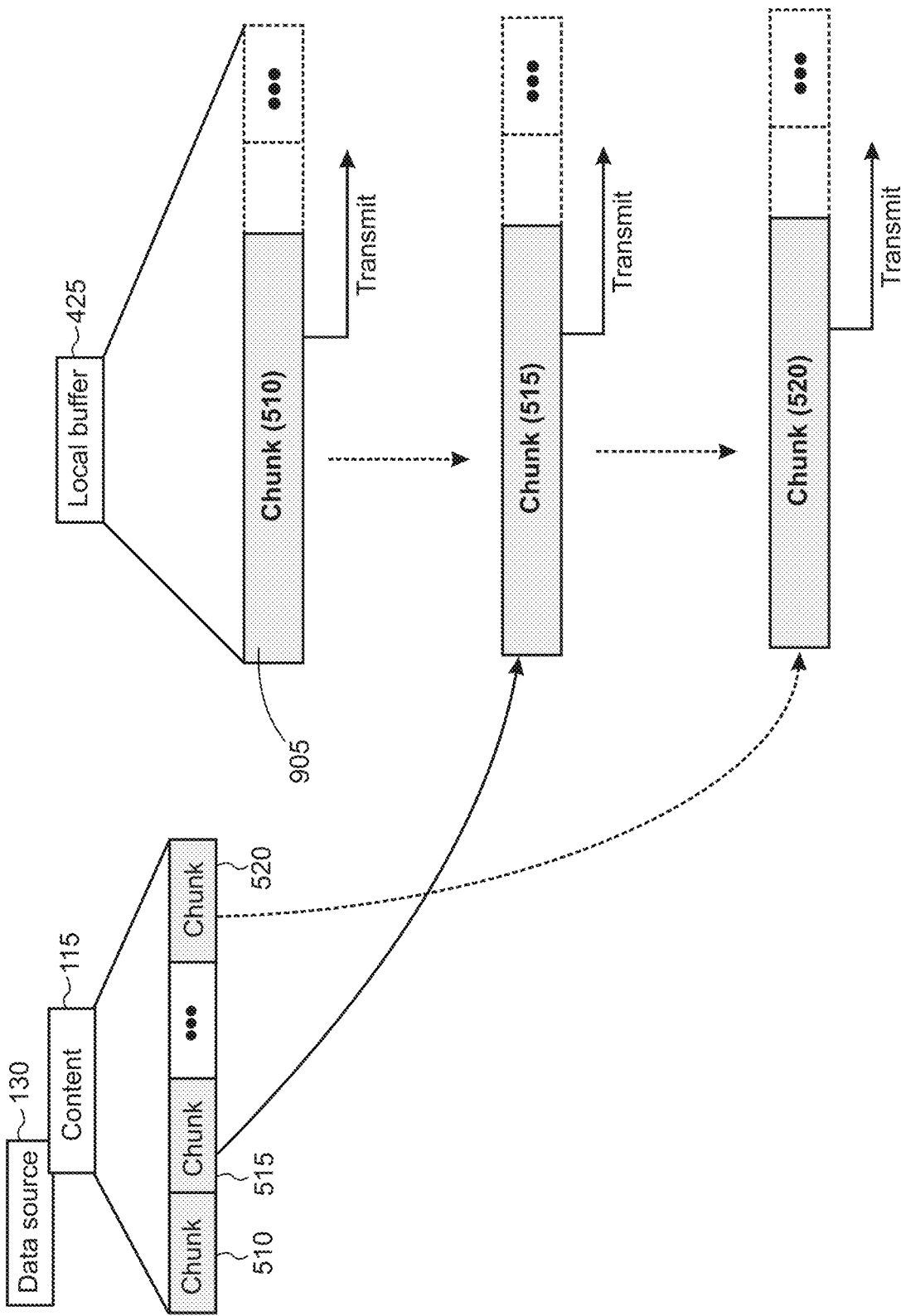

1300

1400

US 10,944,697 B2

SLIDING WINDOW BUFFER FOR MINIMUM LOCAL RESOURCE REQUIREMENTS

BACKGROUND

Computing devices may utilize data buffers in short-term memory (e.g., Random Access Memory (RAM)) from which data is transmitted and received at a receiving device. The sliding window protocol is one method by which data packets are transmitted between computing devices and may be used for reliable in-order delivery of data packets, such as over the Data Link Layer in the OSI (Open Systems Interconnection) model and using TCP/IP (Transmission Control Protocol/Internet Protocol) connections.

Implementations of data buffers using the sliding window protocol on memory-constrained devices can be prohibitively resource intensive. Large blocks of memory may be dedicated to the sliding window protocol mechanism due to its asynchronous nature. In resource-constrained computing devices, additional resources may not be available to leverage typical implementations of the sliding window protocol.

SUMMARY

An owner-free buffer interface is implemented on a local computing device (i.e., a sending device) which utilizes a local buffer that receives chunks of content from a data source for transmission. The content may be pulled from a long-term data source such as a solid-state drive, hard disk drive, or the like. The content is stored in the data source and transmitted to the local buffer associated with the buffer interface. The local buffer comprises multiple memory portions that can be utilized for distinct data transmission operations. A portion of memory can be re-used for a single data transmission operation until the contents from the data source are fully transmitted to a remote computing device (i.e., a receiving device).

An inner position indicates a byte in the data source and a logical position indicates a position of a byte in the local buffer. Unification of the inner and logical positions enables the buffer interface to identify and locate the transmitted chunks of data in the data source. The local computing device can utilize byte positions to retrieve and re-transmit chunks of data if, for example, the device fails to receive an acknowledgement from the remote computing device for any of the data chunks. The ability to retrieve and re-transmit chunks of data enable the buffer interface to transmit the data without necessarily storing the full content in the local buffer or awaiting acknowledgements from the remote computing device before replacing the portion of memory of the local buffer with a subsequent data chunk.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 3 is a diagram illustratively showing how multiple applications can invoke the sliding window buffer through an application programming interface (API);

FIG. 4 is a diagram illustratively showing how content is provided to the sliding window buffer;

FIG. 5 is a diagram illustratively showing content from the data source being comprised of distinct chunks of data;

FIG. 6 is an illustrative diagram in which content from the data source is transferred and converted to the local buffer;

FIG. 7 shows an illustrative environment in which inner positions of the chunk of data are converted to logical positions which have the same values as the inner positions;

FIG. 8 shows an illustrative environment in which inner positions of the chunk of data are converted to logical positions which have an offset from the inner positions;

FIG. 9 shows an illustrative environment in which chunks of data are transmitted and the same portion of memory of the local buffer is reused to store and transmit other chunks of content from the data source;

Like reference numerals indicate like elements in the drawings. Elements are not drawn to scale unless otherwise indicated.

DETAILED DESCRIPTION

A sliding window buffer is implemented on a local computing device in which chunks of data for content from a data source can be sequentially transferred to a local buffer and transmitted to a remote computing device without necessarily storing the full content in the local buffer. Each chunk of data is individually encrypted, if applicable to the operation, upon transfer from the data source to the local buffer. The sliding window buffer utilizes the sliding window protocol to transmit the data chunk to the remote computing device. The portion of memory on the local buffer is reused to store and transmit each remaining chunk of the content, while other portions of memory on the local buffer can be utilized for other content transmission operations. As used herein, the term "portion" refers to a fractional piece of memory that is typically less than the entire memory.

The sliding window buffer utilizes sequential logical positions for bytes of data on the local buffer to correspond with sequential inner positions which identify byte locations in the data source so that the data chunks can be transmitted to the remote computing device without awaiting acknowledgement. If the local computing device fails to receive an acknowledgment for a data chunk after a threshold period of time elapses, the sliding window buffer can leverage the logical positions to retrieve the chunk from the data source into the local buffer and re-transmit the chunk to the remote computing device. Thus, the data within the sliding window is accessible, until released, but is not necessarily stored in local resources. As the data source is immutable, an application command to read the data is directed to the local buffer into which the data chunk from the data source is copied.

Utilization of the sliding window buffer enables computing devices having small form factor and/or limited computing resources (e.g., processing cycles, memory, power, etc.), like Internet of Things (IoT) devices configured to collect and transmit telemetry data, to leverage the sliding window protocol and transmit data based on its available resources. Chunks of data are transferred into the local buffer as necessary and are confined to the portion of memory in the local buffer dedicated to the data transmission operation. This saves memory for other operations performed by the local computing device and reduces processor usage to that which is necessary to transmit individual chunks of the data.

Figure 1:
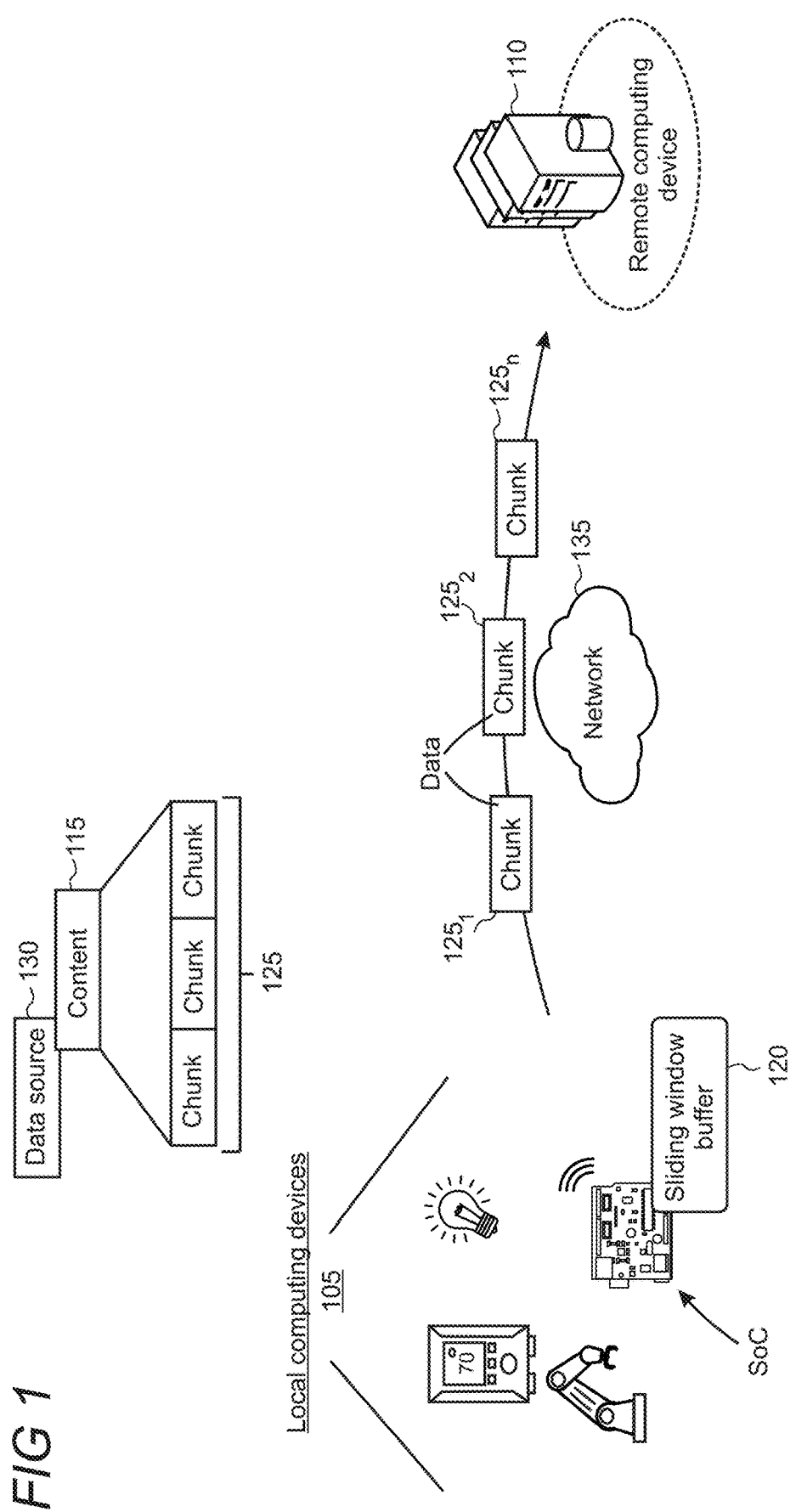
FIG. 1 shows a local computing device illustratively transmitting chunks of data to a remote computing device.

Turning now to the drawings, FIG. 1 shows an illustrative environment in which local computing devices 105 utilize a sliding window buffer 120 to transmit chunks of data 125 to a remote computing device 110 over a network 135. The data chunks 125 may be subparts of content 115 from a data source 130 that are transmitted in pieces to the remote computing device. As discussed below, the data chunks may individually be stored inside a portion of memory dedicated to a local buffer (not shown) of the sliding window buffer and individually and sequentially transmitted to the remote computing device.

The network may be comprised of any one or more of a local area network, wide area network, the internet, and the world wide web. The local computing devices may be, for example, Internet of Things (IoT) devices having network connectivity and configured to detect environmental data or otherwise gather and transmit data to a remote service. A System on a Chip (SoC) device can be used to transition items into IoT devices, such as commercial machinery like a crane, or household items such as a light bulb, thermostat, and the like.

The local computing devices 105 may communicate with a cloud service provider (e.g., the remote computing device 110) that supports various IoT solutions to, for example, facilitate and establish comprehensive knowledge, understanding, or insight into a component or its environment. Exemplary IoT solutions include data storage, data management, analytics, etc. The devices depicted are illustrative, as the number, variety, and/or type of objects or components which can be configured as an IoT device are not limited and can vary to meet the needs of a particular implementation. While IoT devices are described herein, other forms and types of local computing devices can leverage the features of the sliding window buffer as disclosed herein, such as a laptop computer, tablet computer, personal computer, smartphone, media player, game console, and the like. Likewise, while the remote computing device may be implemented using a remote service that provides solutions to the IoT devices, in some embodiments the remote computing device may be a laptop computer, tablet computer, personal computer, smartphone, media player, game console, and the like that is configured to receive data from the local computing devices.

Figure 2:
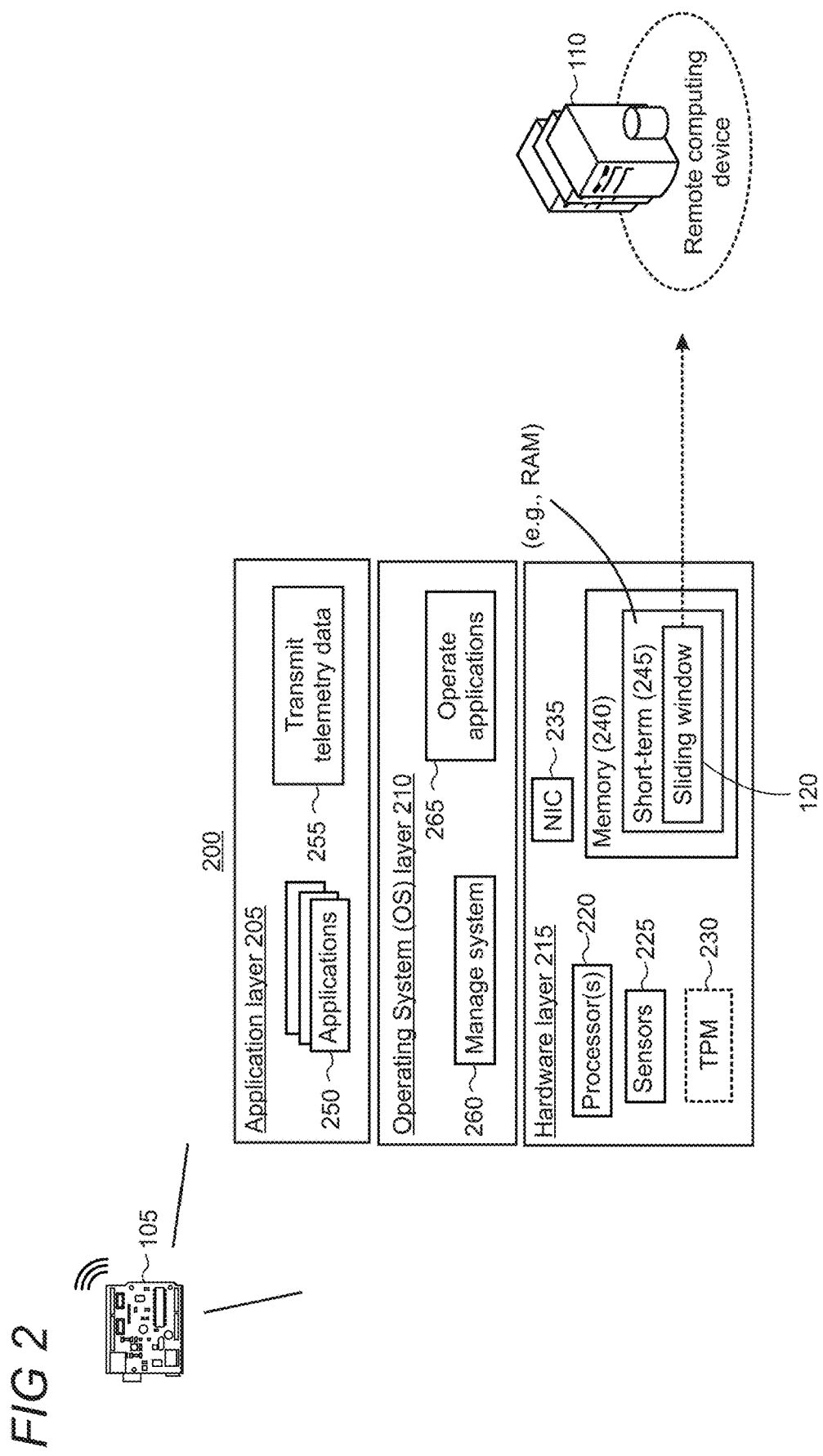
FIG. 2 shows an illustrative layered architecture of the local computing device.

FIG. 2 shows an exemplary layered architecture 200 of a local computing device 105. The architecture is arranged in layers and includes a hardware layer 215, an operating system (OS) layer 210, and an application layer 205. The hardware layer 215 provides an abstraction of the various hardware used by the computing device 105 to the layers above it. In this illustrative example, the hardware layer supports one or more processors 220, memory 240, one or more sensors 225 (e.g., temperature sensor, barometers, proximity sensors, electricity meter) for gathering data, a NIC (network interface controller) 235 including an interface for wireless or wired connections, and, in some embodiments, a trusted platform module (TPM) 230.

The memory 240 may include a solid-state drive (SSD), hard disk drive (HDD) or other long-term hardware-based memory device (not shown) that can be the source of the data (e.g., data source 130) and can store data such as data collected from the one or more sensors 225. The memory may additionally include short-term memory 245 which is in part managed and leveraged by the sliding window buffer 120 in transmitting and, in some embodiments, receiving data. The short-term memory may be random access memory (RAM) on which the local buffer is utilized for data transmission operations. The sliding window buffer is utilized to transmit data to the remote computing device 110, as illustratively shown in FIG. 2.

The TPM 230 may be implemented using a specialized hardware chip that is configured to support hardware-based authentication for the local computing device 105. The TPM is utilized to increase device integrity and security by enabling verification that the computing device performs as intended. The TPM utilizes public keys and private keys that are unique to the TPM and local computing device and are kept private and secure in the TPM. A remote service can utilize the public and private keys for device recognition during an attestation process. In other embodiments, the TPM may be implemented using firmware or a combination of hardware and firmware to provide the authentication functionalities for the computing device.

The application layer 205, in this illustrative example, supports various applications 250 including an application to transmit telemetry data 255 which may have been gathered from the one or more sensors 225. Any number of applications can be utilized by the local computing device 105, whether proprietary or third-party applications. The applications can be implemented using locally executing code. However, in some cases, applications can rely on services and/or remote code execution provided by remote servers or other computing platforms.

The OS layer 210 supports, among other operations, managing the operating system 260 and facilitating operation of the applications 265. The OS layer may interoperate with the application and hardware layers to facilitate execution of programs and perform various functions and features.

FIG. 3 shows an illustrative diagram in which distinct applications 250 invoke an API (Application Programming Interface) 305 to the sliding window buffer 120. The local computing device 105 may employ multiple applications to perform specific operations. The sliding window buffer API is owner-free and thereby can be invoked and utilized by each of the applications instantiated on the local computing device.

FIG. 4 shows an illustrative diagram in which content 115 stored in the data source 130 can be sensor data 410 collected by the one or more sensors 225 or can be other data 415. The other data 415 may be, for example, files, metadata, media, information derived from the sensor data, among other forms of data. The content 115 may include various files or pieces of data which may be stored within the data source by the local computing device and can be transmitted to remote computing devices, such as remote computing device 110 (FIG. 1). The content from the data source may be transferred using the sliding window buffer 120 when an application seeks to transmit content to the remote computing device.

Specifically, a local buffer 425 managed by a buffer interface 430 may receive and temporarily store the content awaiting transmission. The data source 130 may be immutable to application behaviors, and therefore a local buffer 425, to which data from the data source is transmitted for reading or other use by a respective application or module, is employed. A module or application using the sliding window buffer can seek any position of the local buffer between a released position and an end of the local buffer. Once a position is released, all bytes from the beginning of the local buffer to the released position (inclusive) become unavailable.

FIG. 5 shows an illustrative diagram in which content 115 is divided into chunks 510, 515, and 520. Each chunk, or piece, of data content is individually and sequentially brought to the local buffer for transmission.

FIG. 6 shows an illustrative diagram in which data chunks 605 of content 115 from the data source 130 go through a conversion process upon transfer to the local buffer 425 of the sliding window buffer 120. This diagram shows, for example, how the chunks of data from FIG. 5 are transferred to the local buffer from the data source. The content 115 from the data source 130 is transmitted in chunks to the local buffer 425, in which the data chunks 605 are representatively shown as 1-n, n being the final chunk in the series for a given data transfer operation.

Each data chunk includes inner positions 615 which correlate to the bytes of the data in the data source. The data chunk for a currently transmitted chunk is set to a current position and then increments by one for each subsequent byte in the chunk. The data chunk being read is a portion of the data source, as represented by numeral 620. Other portions of the content 115 from the data source 130 include a released, pending, and future data. Released data has been released from access by the local buffer (up to and including the released position), the pending data is that which is currently unacknowledged from the remote computing device, and the future data is that which will be subsequently delivered.

The sliding window portion of the content is defined as the pending and read chunks of data. The first valid position (i.e., data that has not been released) of the data is where the pending data starts, as illustratively shown in FIG. 6. Sliding window protocol utilizes buffers at each end of a data transmission, that is, at the sending device and the receiving device, to manage flow control. The receiving device specifies a receive window size that its buffer can receive from the sending device. The sending device may send up to the receive window size or up to the amount of data available within the sending device's buffer. In typical scenarios, sliding window protocol may be utilized over a TCP/IP (Transmission Control Protocol/Internet Protocol) connection, but other communication protocols can also be used.

When a data chunk is transferred from the data source to the local buffer, the data chunk, in some scenarios, may be subjected to a conversion process in which the data may be offset, as illustratively shown by numeral 625. Upon conversion, the logical positions 635 are the current position plus the offset from the conversion (if applicable), and subsequent bytes in the chunk are incremented by one. Offsetting of the logical positions may or may not be performed, and in either scenario the logical positions correspond to the inner positions in a way that enables the buffer interface to identify the chunks of data from the data source (e.g., when delivery of a data chunk fails).

FIGS. 7 and 8 show illustrative diagrams in which a data chunk is converted from the data source 130 and stored into the local buffer 425. The data chunks are converted 625 for utilization by an application (e.g., exposure, read, release, etc.) since data inside the data source is immutable. When an application performs an operation to, for example, view the contents of the data source, the local buffer and its logical positions are exposed and provided to the application. The logical positions 635 associated with the local buffer may be the equivalent to the inner positions 615 associated with the data source, as shown in FIG. 7. In some embodiments, the logical positions 635 may be different from the inner positions when the conversion employs an offset, as shown in FIG. 8. The exemplary conversion in FIG. 8 employs an offset of plus two. In either scenario, the defined correlation between the inner and logical positions enables the buffer interface to identify a byte position of the data, and thereby the data itself, directly on the data source.

Turning back to FIG. 6, in some scenarios, data chunks may be individually encrypted 630 when transferred to the local buffer so that the data chunks are ready for transmission. The content is therefore encrypted, if applicable, on a per chunk basis which thereby facilitates content transmission being performed on an as needed basis to save device resources (e.g., memory, processing power, etc.). Future data chunks from the data source are not yet encrypted until a respective chunk is transferred to the local buffer.

The local buffer includes separate buffers 610 which may be used for other data transfer operations. The local buffer has allocated a portion of memory for the current data transfer operation to transmit the content 115 from the data source 130 to a remote computing device. Each separate buffer may have its own portion of memory within the local buffer to facilitate a respective data content transmission from the data source 130. The portion of memory is released from use upon completion of the respective data transfer operation and can be re-used for another data transfer operation.

FIG. 9 shows an illustrative environment in which data chunks 510, 515, and 520 are individually and sequentially transferred into a portion of memory 905 within the local buffer 425. The portion of memory dedicated to the instant data transmission operation is re-used for each data chunk after a previous data chunk has been transmitted to the remote computing device. Other portions of memory of the local buffer can be utilized for other data transmission operations. Data chunk 515 replaces data chunk 510 and data chunk 520 replaces data chunk 515. In scenarios in which additional data chunks are to be transmitted between chunks 515 and 520, the data chunk 520 may replace the preceding data chunk. As shown in FIG. 6, the sliding window portion of the data transmission may include pending chunks and chunks that are being currently read and transmitted by the local buffer. Transferred data chunks are not internally released—and are therefore pending—until an acknowledgment is received from the remote computing device receiving the data. Logical positions are maintained for pending data chunks so that the buffer interface can retrieve the chunk from the data source for retransmission, if necessary. The utilization of the inner and logical positions enables the buffer interface to transmit subsequent chunks of data without necessarily waiting for an acknowledgment or storing the previously transmitted chunks locally.

Figure 10:
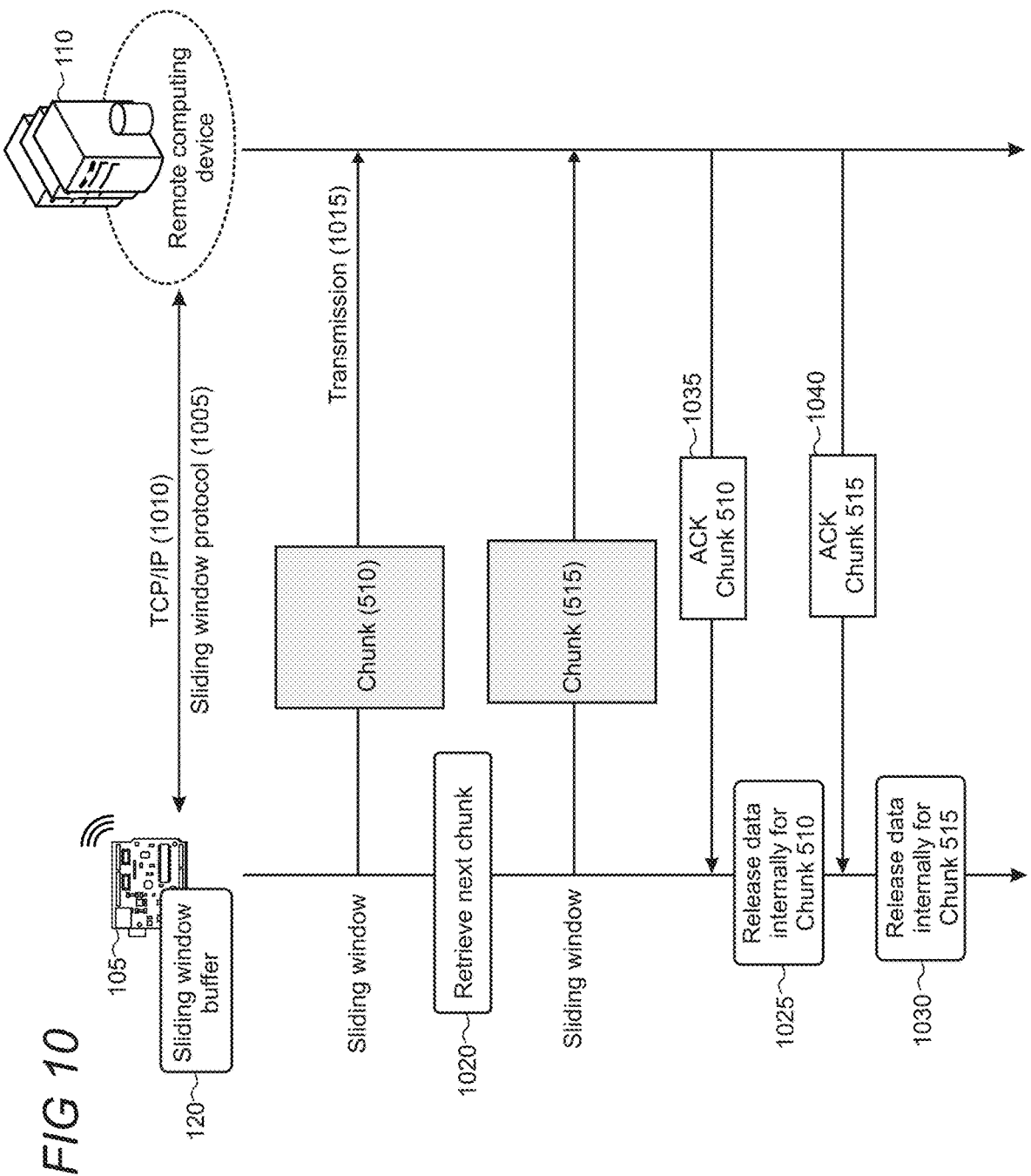
FIG. 10 shows an illustrative process in which chunks of content are transmitted independent of the local computing device receiving an acknowledgement.

FIG. 10 shows a process in which the local computing device 105 transmits data chunks to the remote computing device 110 using the sliding window protocol 1005 over a TCP/IP (Transmission Control Protocol/Internet Protocol) connection 1010. The sliding window protocol utilizes buffers at each end of the data transmission, that is, at the sending device and the receiving device, to manage flow control. The receiving device specifies a receive window size that its buffer can receive from the sending device. The sending device may send up to the receive window size or up to the amount of data available within the sending device's buffer.

The data chunk 510 is transmitted to the remote computing device using the sliding window protocol, as illustratively shown by numeral 1015 (each line represents a transmission). The local computing device retrieves the next data chunk 1020 after transmitting chunk 510 without receiving an acknowledgement. The portion of memory for the transmission operation may be reused for data chunk 515, which is transmitted to the remote computing device using the sliding window protocol.

After transmitting the data chunk 515, the local computing device may receive acknowledgements 1035 and 1040 from the remote computing device 110. The sliding window buffer may release data chunks internally after receiving the acknowledgments, as representatively shown by numerals 1025 and 1030. Releasing data chunks may include, for example, disregarding the logical positions to the data source for the data chunks which were successfully transmitted.

Figure 11:
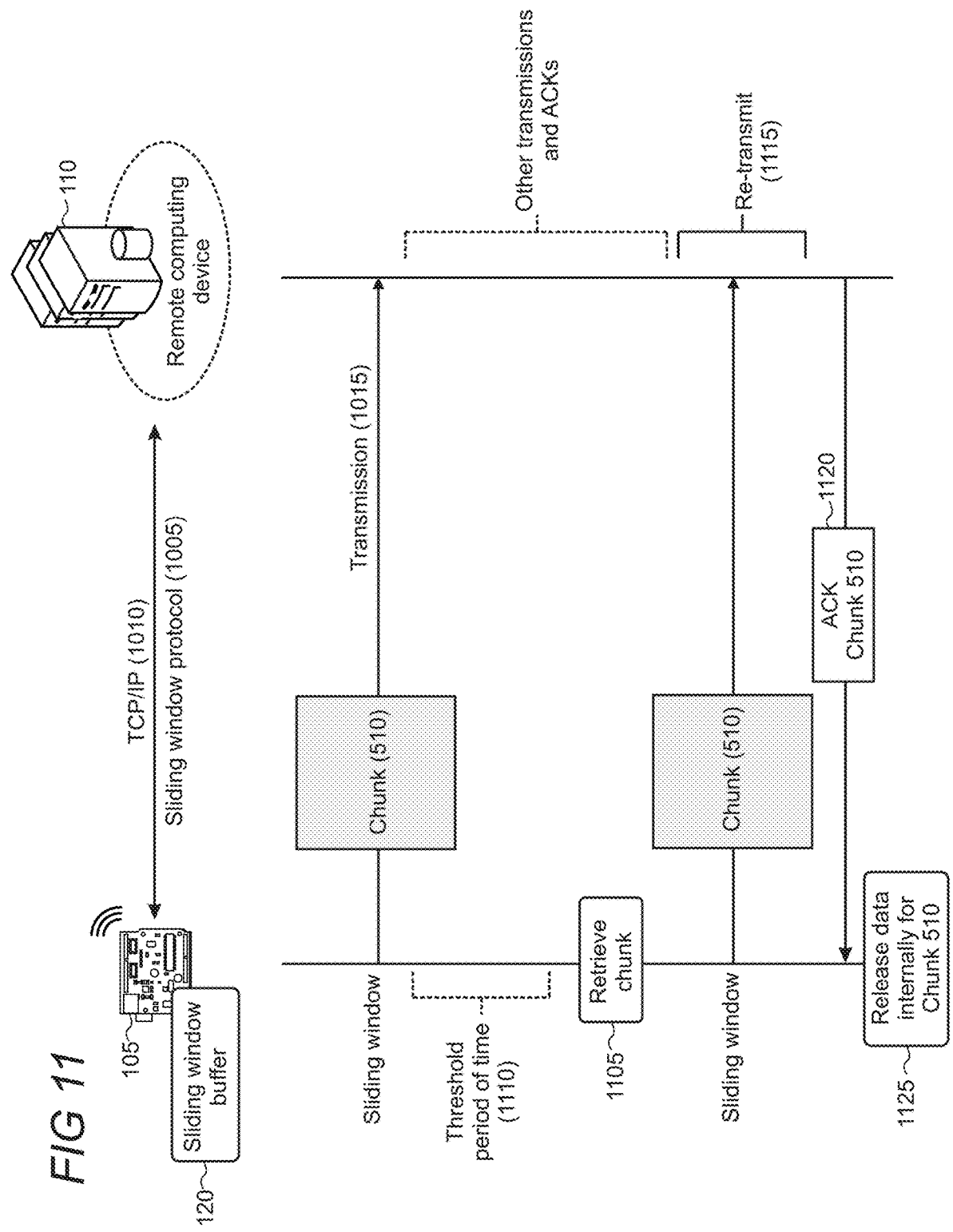
FIG. 11 shows an illustrative process in which a chunk of data is retrieved from the data source upon the local computing device failing to receive an acknowledgement after a threshold period of time.

FIG. 11 shows a process in which the local computing device 105 transmits data chunks to the remote computing device 110 and the local computing device fails to receive an acknowledgement. The sliding window buffer 120 retrieves the data chunk 510 from the data source after a threshold period of time 1110 elapses, as illustratively shown by numeral 1105. The threshold period of time may be a defined period of time such as five seconds, ten seconds, etc.

Other data chunk transmissions and acknowledgments can occur while the threshold period of time elapses. The sliding window buffer 120 is not limited or forced to wait for any particular acknowledgement to a transmitted data chunk but can continue transmitting other data chunks while waiting for the acknowledgement. The local computing device re-transmits 1115 the data chunk 510 after retrieving the failed chunk from the data source, and then, upon receiving the acknowledgement 1120, releases the data internally 1125. The correlation between the inner and logical byte positions enable the sliding window buffer to locate and retrieve the data chunk.

Figure 12:
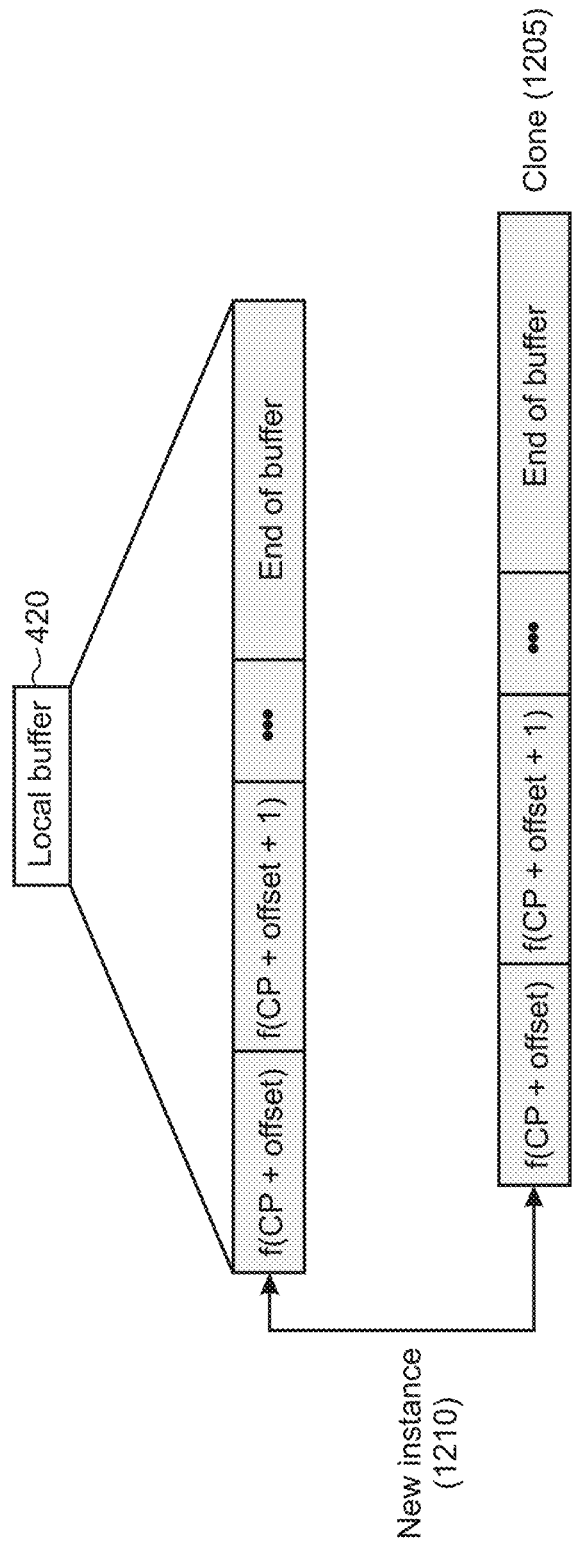
FIG. 12 shows an illustrative environment in which a clone of the local buffer is created using a new instance of the local buffer.

FIG. 12 shows an illustrative diagram of a clone 1205 which is created from a new instance 1210 of the local buffer 425. The clone of the local buffer starts from the current position of the local buffer and extends to the end of the local buffer. In some embodiments, the clone 1205 is not a copy of the data itself but rather is another instance of the data which references the data chunk within the local buffer. New logical positions for the buffer can be generated which provide an offset of the cloned buffer. The clone can be used to, for example, concatenate buffers so that the second buffer can have an offset of the end of the first buffer plus one.

Figure 13:
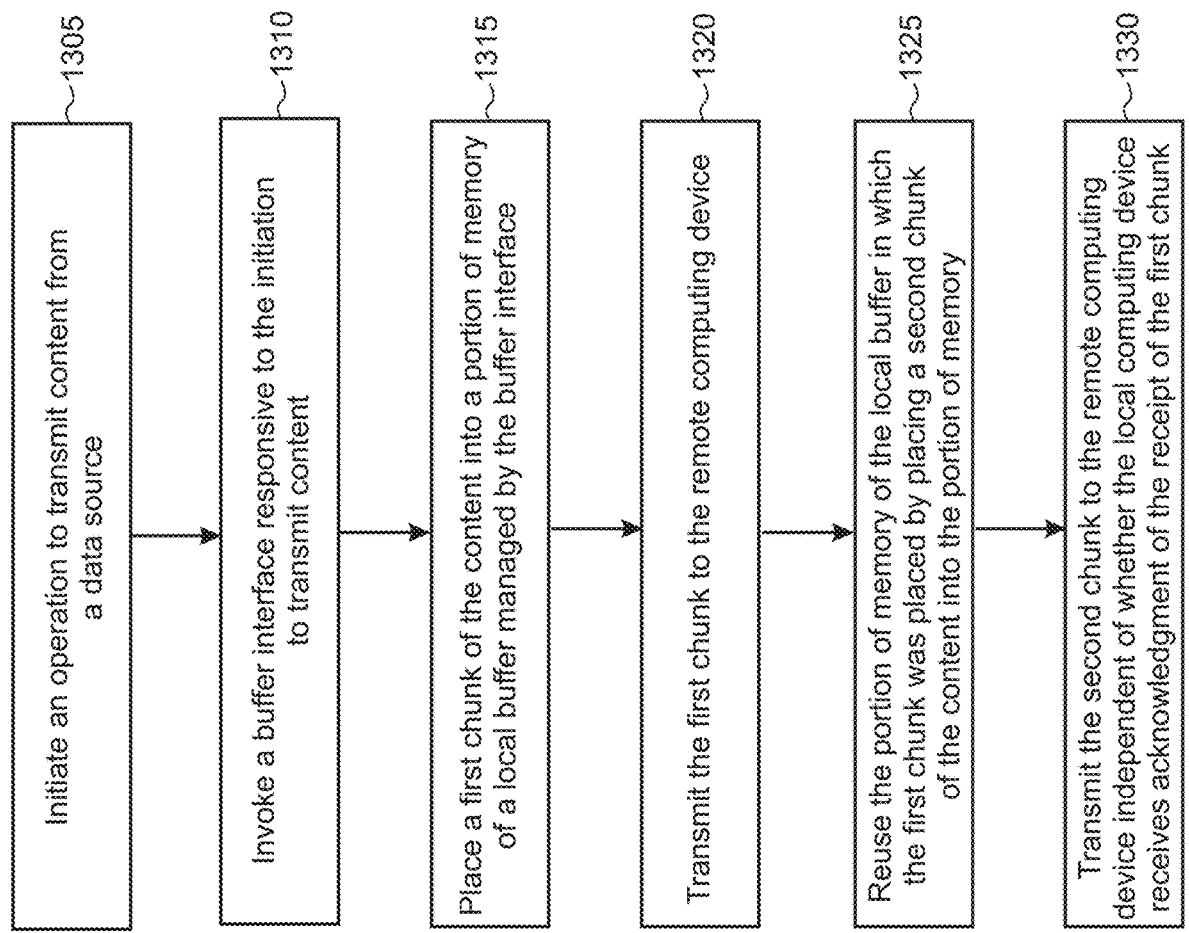
FIGS. 13-15 are flowcharts of illustrative methods performed by one or both of the local computing device and the remote computing device.
Figure 14:
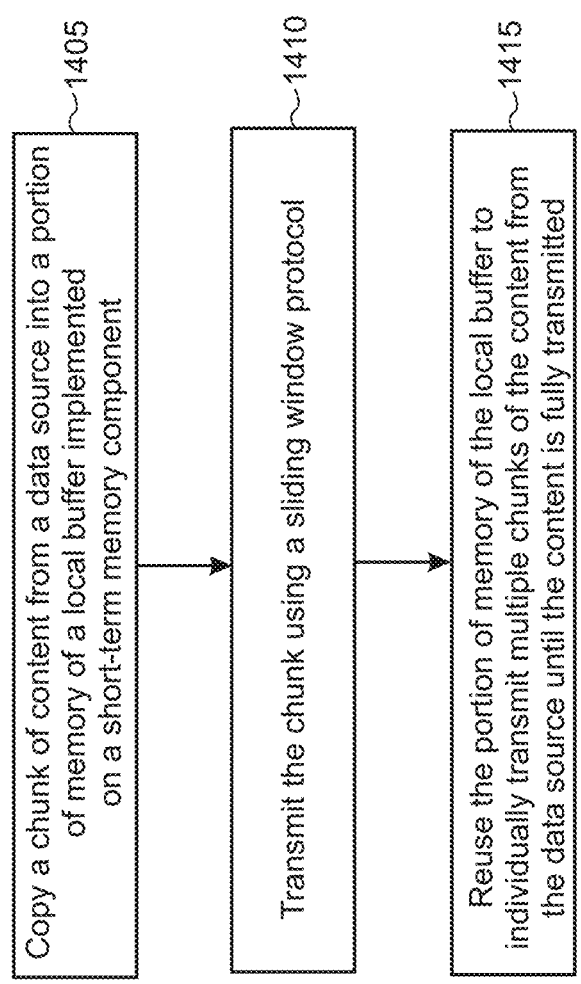
Figure 15:
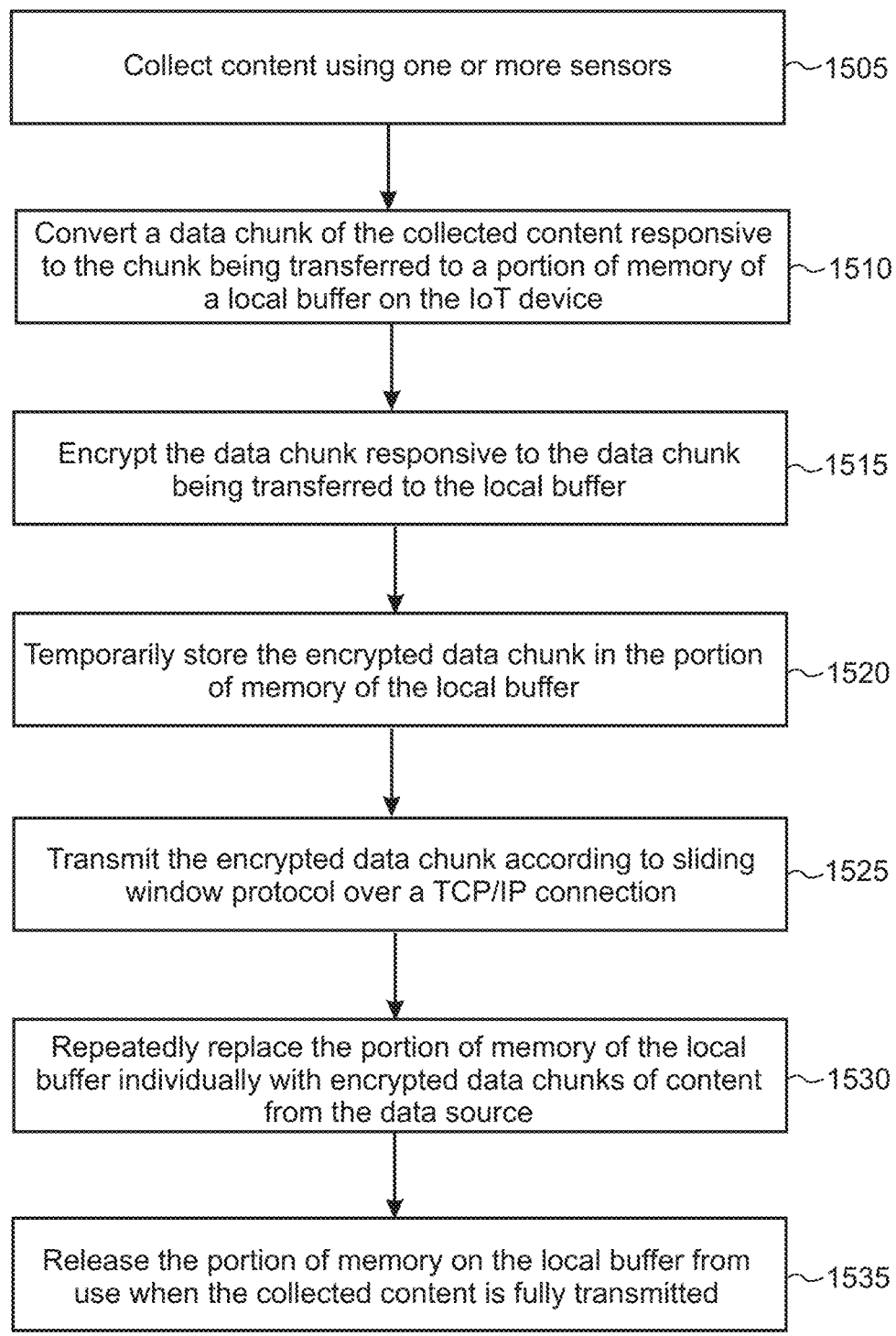

FIGS. 13-15 are flowcharts of illustrative methods 1300, 1400, and 1500 that may be performed using the local computing device 105. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1305, in FIG. 13, a local computing device initiates an operation to transmit content from a data source. In step 1310, the local computing device invokes a buffer interface responsive to the initiation to transmit content. In step 1315, the local computing device places a first chunk of the content into a portion of memory of a local buffer managed by the buffer interface. The first chunk may be less than a whole of the content to be transmitted. In step 1320, the local computing device transmits the first chunk to the remote computing device. In step 1325, the local computing device reuses the portion of memory of the local buffer in which the first chunk was placed by placing a second chunk of the content into the portion of memory. In step 1330, the local computing device transmits the second chunk to a remote computing device independent of whether the local computing device receives acknowledgement of the receipt of the first chunk.

FIG. 14 is a flowchart of an illustrative method 1400 that may be performed by a local computing device. In step 1405, the local computing device copies a chunk of content from a data source into a portion of memory of a local buffer implemented on a short-term memory component. In step 1410, the local computing device transmits the chunk using a sliding window protocol. In step 1415, the local computing device reuses the portion of memory of the local buffer to individually transmit multiple chunks of the content until the content is fully transmitted.

FIG. 15 is a flowchart of an illustrative method 1500 that may be performed by a local computing device, such as an IoT device configured to collect data. In step 1505, the IoT device collects content using one or more sensors. In step 1510, the IoT device converts a data chunk of the collected content responsive to the data chunk being transferred to a portion of memory of a local buffer on the IoT device. In step 1515, the IoT device encrypts the data chunk responsive to the data chunk being transferred to the local buffer. In step 1520, the IoT device temporarily stores the encrypted chunk in the portion of memory of the local buffer. In step 1525, the IoT device transmits the encrypted data chunk according to sliding window protocol over a TCP/IP connection. In step 1530, the IoT device repeatedly replaces the portion of memory of the local buffer individually with encrypted chunks of content from the data source. In step 1535, the IoT device releases the portion of memory on the local buffer from use when the content is fully transmitted.

Figure 16:
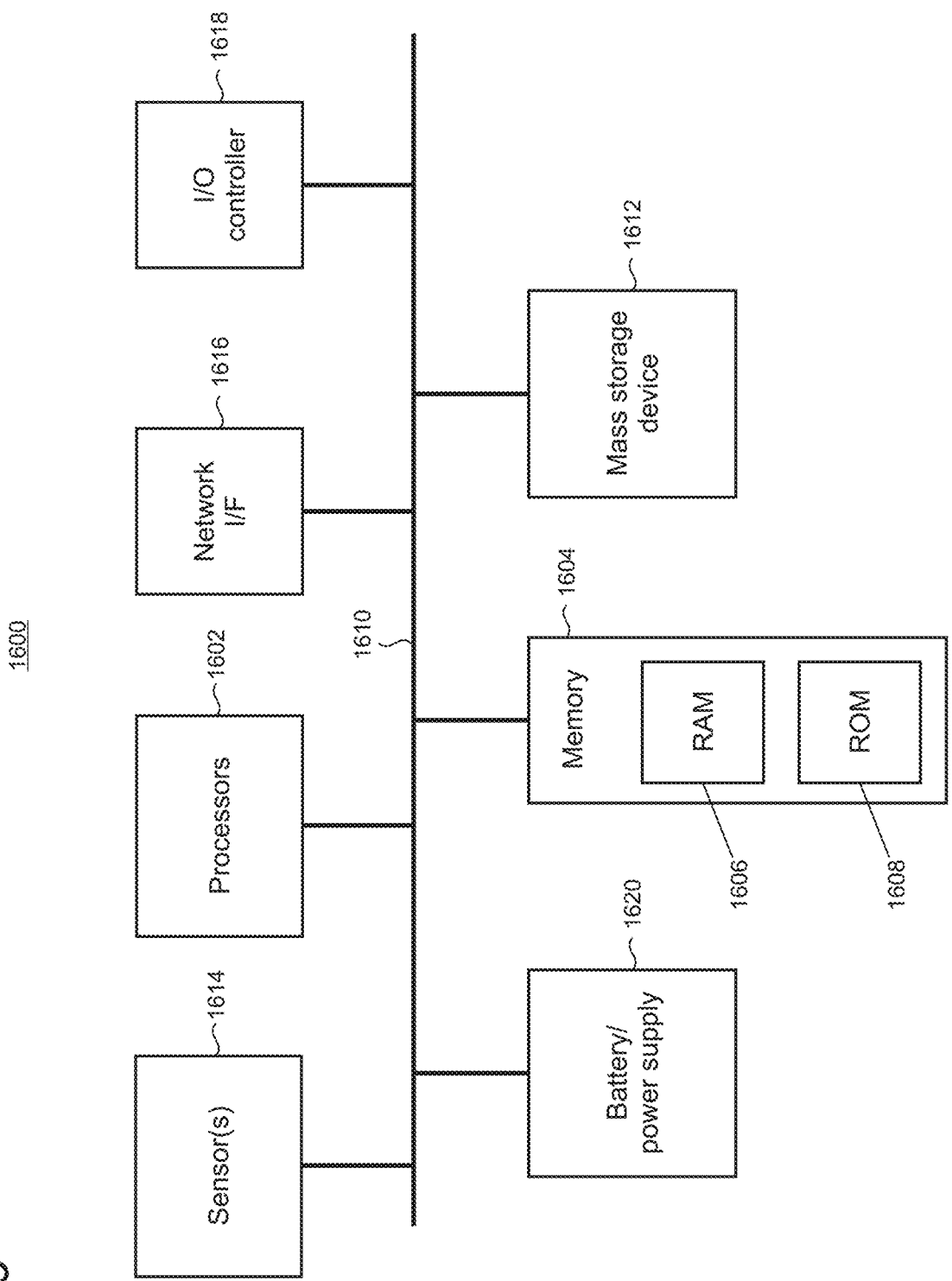
FIG. 16 is a simplified block diagram of an illustrative local computing device that may be used at least in part to implement the present sliding window buffer for minimum local resource requirements.

FIG. 16 shows an illustrative architecture 1600 for a client computing device such as a laptop computer or personal computer for the present sliding window buffer for minimum local resource requirements. The architecture 1600 illustrated in FIG. 16 includes one or more processors 1602

(e.g., central processing unit, dedicated Artificial Intelligence chip, graphics processing unit, etc.), a system memory 1604, including RAM (random access memory) 1606 and ROM (read only memory) 1608, and a system bus 1610 that operatively and functionally couples the components in the architecture 1600. A basic input/output system containing the basic routines that help to transfer information between elements within the architecture 1600, such as during startup, is typically stored in the ROM 1608. The architecture 1600 further includes a mass storage device 1612 for storing software code or other computer-executed code that is utilized to implement applications, the file system, and the operating system. The mass storage device 1612 is connected to the processor 1602 through a mass storage controller (not shown) connected to the bus 1610. The mass storage device 1612 and its associated computer-readable storage media provide non-volatile storage for the architecture 1600. Although the description of computer-readable storage media contained herein refers to a mass storage device, such as a hard disk or CD-ROM drive, it may be appreciated by those skilled in the art that computer-readable storage media can be any available storage media that can be accessed by the architecture 1600.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVD, HD-DVD (High Definition DVD), Blu-ray, or other optical storage, magnetic cassette, magnetic tape, magnetic disk storage or other magnetic storage device, or any other medium which can be used to store the desired information and which can be accessed by the architecture 1600.

According to various embodiments, the architecture 1600 may operate in a networked environment using logical connections to remote computers through a network. The architecture 1600 may connect to the network through a network interface unit 1616 connected to the bus 1610. It may be appreciated that the network interface unit 1616 also may be utilized to connect to other types of networks and remote computer systems. The architecture 1600 also may include an input/output controller 1618 for receiving and processing input from a number of other devices, including a keyboard, mouse, touchpad, touchscreen, control devices such as buttons and switches or electronic stylus (not shown in FIG. 16). Similarly, the input/output controller 1618 may provide output to a display screen, user interface, a printer, or other type of output device (also not shown in FIG. 16).

It may be appreciated that the software components described herein may, when loaded into the processor 1602 and executed, transform the processor 1602 and the overall architecture 1600 from a general-purpose computing system into a special-purpose computing system customized to facilitate the functionality presented herein. The processor 1602 may be constructed from any number of transistors or other discrete circuit elements, which may individually or collectively assume any number of states. More specifically, the processor 1602 may operate as a finite-state machine, in response to executable instructions contained within the software modules disclosed herein. These computer-executable instructions may transform the processor 1602 by specifying how the processor 1602 transitions between states, thereby transforming the transistors or other discrete hardware elements constituting the processor 1602.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

The architecture 1600 may further include one or more sensors 1614 or a battery or power supply 1620. The sensors may be coupled to the architecture to pick up data about an environment or a component, including temperature, pressure, etc. Exemplary sensors can include a thermometer, accelerometer, smoke or gas sensor, pressure sensor (barometric or physical), light sensor, ultrasonic sensor, gyroscope, among others. The power supply may be adapted with an AC power cord or a battery, such as a rechargeable battery for portability.

In light of the above, it may be appreciated that many types of physical transformations take place in the architecture 1600 in order to store and execute the software components presented herein. It also may be appreciated that the architecture 1600 may include other types of computing devices, including wearable devices, handheld computers, embedded computer systems, smartphones, PDAs, and other types of computing devices known to those skilled in the art. It is also contemplated that the architecture 1600 may not include all of the components shown in FIG. 16, may include other components that are not explicitly shown in FIG. 16, or may utilize an architecture completely different from that shown in FIG. 16.

Figure 17:
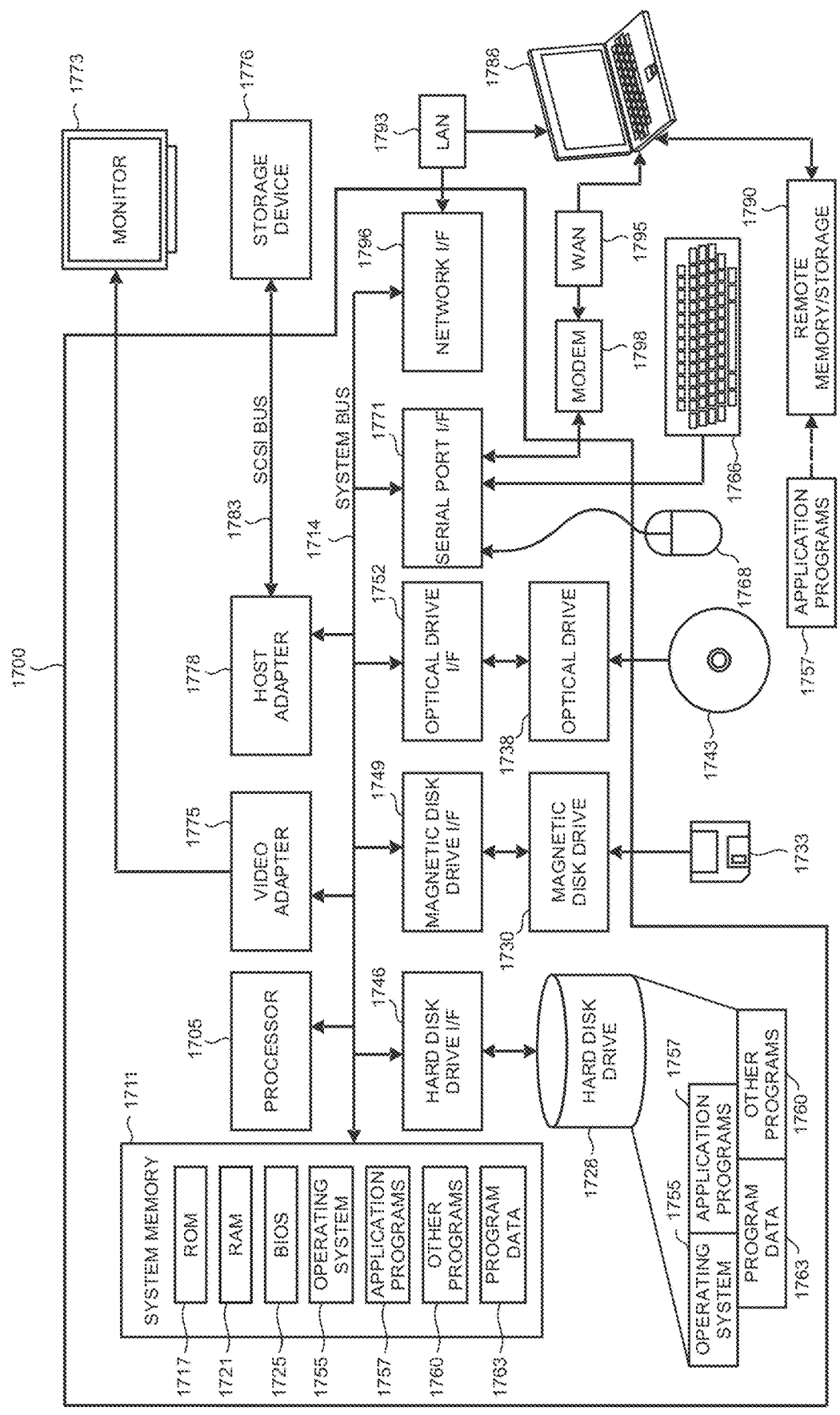
FIG. 17 is a simplified block diagram of an illustrative remote computing device, remote service, or computer system that may be used in part to implement the present sliding window buffer for minimum local resource requirements.

FIG. 17 is a simplified block diagram of an illustrative computer system 1700 such as a PC or server with which the present sliding window buffer for minimum local resource requirements may be implemented. Computer system 1700 includes a processor 1705, a system memory 1711, and a system bus 1714 that couples various system components including the system memory 1711 to the processor 1705. The system bus 1714 may be any of several types of bus structures including a memory bus or memory controller, a peripheral bus, or a local bus using any of a variety of bus architectures. The system memory 1711 includes read only memory (ROM) 1717 and random access memory (RAM) 1721. A basic input/output system (BIOS) 1725, containing the basic routines that help to transfer information between elements within the computer system 1700, such as during startup, is stored in ROM 1717. The computer system 1700 may further include a hard disk drive 1728 for reading from and writing to an internally disposed hard disk (not shown), a magnetic disk drive 1730 for reading from or writing to a removable magnetic disk 1733 (e.g., a floppy disk), and an optical disk drive 1738 for reading from or writing to a removable optical disk 1743 such as a CD (compact disc), DVD (digital versatile disc), or other optical media. The hard disk drive 1728, magnetic disk drive 1730, and optical disk drive 1738 are connected to the system bus 1714 by a hard disk drive interface 1746, a magnetic disk drive interface 1749, and an optical drive interface 1752, respectively. The drives and their associated computer-readable storage media provide non-volatile storage of computer-readable instructions, data structures, program modules, and other data for the computer system 1700. Although this illustrative example includes a hard disk, a removable magnetic disk 1733, and a removable optical disk 1743, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present sliding window buffer for minimum local resource requirements. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules may be stored on the hard disk, magnetic disk 1733, optical disk 1743, ROM 1717, or RAM 1721, including an operating system 1755, one or more application programs 1757, other program modules 1760, and program data 1763. A user may enter commands and information into the computer system 1700 through input devices such as a keyboard 1766 and pointing device 1768 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1705 through a serial port interface 1771 that is coupled to the system bus 1714, but may be connected by other interfaces, such as a parallel port, game port, or universal serial bus (USB). A monitor 1773 or other type of display device is also connected to the system bus 1714 via an interface, such as a video adapter 1775. In addition to the monitor 1773, personal computers typically include other peripheral output devices (not shown), such as speakers and printers. The illustrative example shown in FIG. 17 also includes a host adapter 1778, a Small Computer System Interface (SCSI) bus 1783, and an external storage device 1776 connected to the SCSI bus 1783.

The computer system 1700 is operable in a networked environment using logical connections to one or more remote computers, such as a remote computer 1788. The remote computer 1788 may be selected as another personal computer, a server, a router, a network PC, a peer device, or other common network node, and typically includes many or all of the elements described above relative to the computer system 1700, although only a single representative remote memory/storage device 1790 is shown in FIG. 17. The logical connections depicted in FIG. 17 include a local area network (LAN) 1793 and a wide area network (WAN) 1795. Such networking environments are often deployed, for example, in offices, enterprise-wide computer networks, intranets, and the Internet.

When used in a LAN networking environment, the computer system 1700 is connected to the local area network 1793 through a network interface or adapter 1796. When used in a WAN networking environment, the computer system 1700 typically includes a broadband modem 1798, network gateway, or other means for establishing communications over the wide area network 1795, such as the Internet. The broadband modem 1798, which may be internal or external, is connected to the system bus 1714 via a serial port interface 1771. In a networked environment, program modules related to the computer system 1700, or portions thereof, may be stored in the remote memory storage device 1790. It is noted that the network connections shown in FIG. 17 are illustrative and other means of establishing a communications link between the computers may be used depending on the specific requirements of an application of the present sliding window buffer for minimum local resource requirements.

Various exemplary embodiments of the present sliding window buffer for minimum local resource requirements are now presented by way of illustration and not as an exhaustive list of all embodiments. An example includes a method performed by a local computing device configured with a sliding window buffer including a buffer interface and a local buffer to transmit data in chunks to a remote computing device, comprising: initiating an operation to transmit content from a data source; invoking the buffer interface responsive to the initiation of the operation to transmit content; placing a first chunk of the content into a portion of memory of a local buffer managed by the buffer interface, wherein the first chunk is less than a whole of the content to be transmitted; transmitting the first chunk to the remote computing device; reusing the portion of memory of the local buffer in which the first chunk was placed by placing a second chunk of the content into the portion of memory; and transmitting the second chunk to the remote computing device independent of whether the local computing device receives acknowledgement of receipt of the first chunk at the remote computing device.

In another example, the method further comprises: failing to receive an acknowledgement that the first chunk was received at the remote computing device; retrieving the first chunk of the content; placing the retrieved first chunk into the portion of memory of the local buffer; and re-transmitting the first chunk to the remote computing device. In another example, logical positions associated with the local buffer correspond to inner positions which identify a byte position of the content in the data source, and wherein the first chunk of the content is retrieved using the correspondence between the logical and inner positions. In another example, the method further comprises converting the inner positions to the logical positions responsive to a chunk of data being transferred to the local buffer, wherein the converting includes offsetting a byte position of the logical positions from the inner positions. In another example, the local computing device retrieves the first chunk of the content after a threshold period of time elapses without receiving the acknowledgement. In another example, chunks of data are transmitted to the remote computing device using sliding window protocol. In another example, the chunks of data are transmitted to the remote computing device over a TCP/IP (Transmission Control Protocol/Internet Protocol) connection. In another example, the method further comprises releasing the portion of memory responsive to the content being fully transmitted to the remote computing device and the local computing device receiving acknowledgement that each chunk has been received, wherein the releasing makes the portion of memory available for other data transmission operations. In another example, multiple portions of memory within the local buffer are used for distinct data content transmission operations, and wherein each portion of memory of the local buffer is re-usable by specific data content transmission operations until all chunks of a respective content transmission operation are successfully transmitted. In another example, short-term memory is utilized for the local buffer of the local computing device. In another example, the content on the data source is immutable. In another example, chunks of content are individually encrypted before being placed into the portion of memory of the local buffer.

A further example includes a local computing device configured to transmit data in chunks to a remote service, comprising: one or more processors; a short-term memory component; and one or more hardware-based memory devices which store computer-readable instructions which, when executed by the one or more processors, cause the local computing device to: copy a chunk of content from a data source into a portion of memory of a local buffer implemented on the short-term memory component; transmit the chunk using a sliding window protocol; and re-use the portion of memory of the local buffer to individually transmit multiple chunks of the content from the data source until the content is fully transmitted, wherein a buffer interface which manages utilization of the local buffer utilizes logical positions for bytes of data on the local buffer that correspond to inner positions for bytes of data on the data source to handle data retransmits responsive to transmission failures of one or more chunks of the content.

In another example, the content is sensor data picked up by sensors implemented by the local computing device. In another example, the local computing device is an Internet of Things (IoT) enabled device configured to pick up and transmit environmental data. In another example, the short-term memory component is incorporated into hardware or software. In another example, the short-term memory component is random access memory (RAM). In another example, the executed instructions further cause the local computing device to: identify a chunk of the content in which transmission failed; retrieve the chunk of the content and place the chunk into the portion of memory of the local buffer, wherein retrieval of the chunk is done using the corresponding logical and inner positions; and re-transmit the chunk.

A further example includes one or more hardware-based non-transitory computer-readable memory devices storing instructions which, when executed by one or more processors disposed in an internet of things (IoT) device, cause the IoT device to: collect content using one or more sensors; convert a data chunk of the collected content responsive to the chunk being transferred to a portion of memory of a local buffer on the IoT device, in which the conversion includes at least establishing logical positions on the local buffer which identify an inner position of the collected content stored in a data source on the IoT device; encrypt the data chunk responsive to the data chunk being transferred to the local buffer; temporarily store the encrypted data chunk in the portion of memory of the local buffer; transmit the encrypted data chunk according to a sliding window protocol over a TCP/IP (Transmission Control Protocol/Internet Protocol) connection; repeatedly replace the portion of memory of the local buffer individually with encrypted data chunks of the content from the data source, in which the portion of memory is replaced after respective chunks are fully transmitted, and wherein each data chunk is converted and encrypted responsive to being transferred to the local buffer, such that new logical positions are established which identify corresponding inner positions of the collected content stored in the data source on the IoT device; and release the portion of memory on the local buffer from use responsive to the collected content being fully transmitted.

In another example, the portion of memory of the local buffer is replaced with subsequent data chunks of the content irrespective of success or failure of a remote computing device receiving a respective data chunk.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method performed by a local computing device, comprising:
   configuring the local computing device with a local buffer to transmit data in chunks to a remote computing device;
   identifying data chunks from a data source using a sliding window;
   initiating an operation to transmit content from the data source;
   operating the local buffer responsive to the initiation of the operation to transmit content wherein only a subset of the sliding window is placed into memory of the local buffer;
   placing a first chunk of the content into a portion of memory of the local buffer, wherein the first chunk is less than a whole of the content to be transmitted;
   transmitting the first chunk to the remote computing device;
   reusing the portion of memory of the local buffer in which the first chunk was placed by placing a second chunk of the content into the portion of memory; and
   transmitting the second chunk to the remote computing device independent of whether the local computing device receives acknowledgement of receipt of the first chunk at the remote computing device.

2. The method of claim 1, further comprising:
   failing to receive an acknowledgement that the first chunk was received at the remote computing device;
   retrieving the first chunk of the content;
   placing the retrieved first chunk into the portion of memory of the local buffer; and
   re-transmitting the first chunk to the remote computing device.

3. The method of claim 2, in which logical positions associated with the local buffer correspond to inner positions which identify a byte position of the content in the data source, and wherein the first chunk of the content is retrieved using the correspondence between the logical and inner positions.

4. The method of claim 3, further comprising converting the inner positions to the logical positions responsive to a chunk of data being transferred to the local buffer, wherein the converting includes offsetting a byte position of the logical positions from the inner positions.

5. The method of claim 1, in which the local computing device retrieves the first chunk of the content after a threshold period of time elapses without receiving the acknowledgement.

6. The method of claim 1, in which chunks of data are transmitted to the remote computing device using sliding window protocol.

7. The method of claim 1, in which the chunks of data are transmitted to the remote computing device over a TCP/IP (Transmission Control Protocol/Internet Protocol) connection.

8. The method of claim 1, further comprising releasing the portion of memory responsive to the content being fully transmitted to the remote computing device and the local computing device receiving acknowledgement that each chunk has been received, wherein the releasing makes the portion of memory available for other data transmission operations.

9. The method of claim 1, in which multiple portions of memory within the local buffer are used for distinct data content transmission operations, and wherein each portion of memory of the local buffer is re-usable by specific data content transmission operations until all chunks of a respective content transmission operation are successfully transmitted.

10. The method of claim 1, in which short-term memory is utilized for the local buffer of the local computing device.

11. The method of claim 9, in which the content on the data source is immutable.

12. The method of claim 1, in which chunks of content are individually encrypted before being placed into the portion of memory of the local buffer.

13. A local computing device configured to transmit data in chunks to a remote service, comprising:
one or more processors;
a short-term memory component; and
one or more hardware-based memory devices which store computer-readable instructions which, when executed by the one or more processors, cause the local computing device to:
copy a chunk of content from a data source into a portion of memory of a local buffer implemented on the short-term memory component;
transmit the chunk using a sliding window protocol, wherein only a subset of the sliding window is placed into the short-term memory component of the local buffer; and
re-use the portion of the short-term memory component of the local buffer to individually transmit multiple chunks of the content from the data source until the content is fully transmitted, wherein a buffer interface which manages utilization of the local buffer utilizes logical positions for bytes of data on the local buffer that correspond to inner positions for bytes of data on the data source to handle data retransmits responsive to transmission failures of one or more chunks of the content.

14. The local computing device of claim 13, in which the content is sensor data picked up by sensors implemented by the local computing device.

15. The local computing device of claim 14, in which the local computing device is an Internet of Things (IoT) enabled device configured to pick up and transmit environmental data.

16. The local computing device of claim 13, in which the short-term memory component is incorporated into hardware or software.

17. The local computing device of claim 13, in which the short-term memory component is random access memory (RAM).

18. The local computing device of claim 13, in which the executed instructions further cause the local computing device to:
identify a chunk of the content in which transmission failed;
retrieve the chunk of the content and place the chunk into the portion of memory of the local buffer, wherein retrieval of the chunk is done using the corresponding logical and inner positions; and
re-transmit the chunk.

19. One or more hardware-based non-transitory computer-readable memory devices storing instructions which, when executed by one or more processors disposed in an internet of things (IoT) device, cause the IoT device to:
collect content using one or more sensors;
convert a data chunk of the collected content responsive to the chunk being transferred to a portion of memory of a local buffer on the IoT device, in which the conversion includes at least establishing logical positions on the local buffer on the IoT device which identify an inner position of the collected content stored in a data source, in which data chunks are identified on the data source using a sliding window;
encrypt the data chunk responsive to the data chunk being transferred to the local buffer;
temporarily store the encrypted data chunk in the portion of memory of the local buffer;
transmit the encrypted data chunk according to a sliding window protocol over a TCP/IP (Transmission Control Protocol/Internet Protocol) connection;
repeatedly replace the portion of memory of the local buffer individually with encrypted data chunks of the content from the data source wherein only a subset of the sliding window is placed into the portion of memory of the local buffer on the IoT device, in which the portion of memory is replaced after respective chunks are fully transmitted, and wherein each data chunk is converted and encrypted responsive to being transferred to the local buffer on the IoT device, such that new logical positions are established which identify corresponding inner positions of the collected content stored in the data source; and
release the portion of memory on the local buffer from use responsive to the collected content being fully transmitted.

20. The one or more hardware-based non-transitory computer-readable memory devices of claim 19, in which the portion of memory of the local buffer is replaced with subsequent data chunks of the content irrespective of success or failure of a remote computing device receiving a respective data chunk.

* * * * *